(12) United States Patent
Prexl et al.

(10) Patent No.: US 10,958,173 B2
(45) Date of Patent: Mar. 23, 2021

(54) FIXED FREQUENCY BUCK-BOOST POWER CONVERTER CONTROL

(71) Applicant: TEXAS INSTRUMENTS INCORPORATED, Dallas, TX (US)

(72) Inventors: Franz Prexl, Niederding (DE); Anmol Sharma, Freising (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/232,214

(22) Filed: Dec. 26, 2018

(65) Prior Publication Data
US 2020/0212805 A1 Jul. 2, 2020

(51) Int. Cl.
H02M 3/158 (2006.01)
H02M 1/08 (2006.01)

(52) U.S. Cl.
CPC ........... H02M 3/1582 (2013.01); H02M 1/08 (2013.01)

(58) Field of Classification Search
CPC .............................. H02M 1/08; H02M 3/1582
See application file for complete search history.

(56) References Cited

U.S. PATENT DOCUMENTS

| 10,014,778 B1 | 7/2018 | Wei et al. | |
| 2007/0210782 A1* | 9/2007 | Prexl | H02M 3/1582 323/288 |
| 2008/0303502 A1* | 12/2008 | Haiplik | H02M 3/1582 323/283 |
| 2010/0231272 A1* | 9/2010 | Chen | H02M 3/1582 327/140 |
| 2016/0315535 A1 | 10/2016 | Ouyang | |
| 2016/0365790 A1* | 12/2016 | Ye | H02M 3/1582 |
| 2018/0337603 A1 | 11/2018 | Houston et al. | |
| 2020/0076306 A1* | 3/2020 | Pullen | H02M 3/1582 |

FOREIGN PATENT DOCUMENTS

WO  2012100853  8/2012

OTHER PUBLICATIONS

Patent Cooperation Treaty, International Application No. PCT/US2019/066726, dated Mar. 5, 2020, 2 pages.

* cited by examiner

*Primary Examiner* — Matthew V Nguyen
*Assistant Examiner* — Jye-June Lee
(74) *Attorney, Agent, or Firm* — Ray A. King; Charles A. Brill; Frank D. Cimino

(57) ABSTRACT

The present disclosure provides for a processing element configured to couple to a first ramp generator and a second ramp generator and control the first ramp generator while a power converter is operating in a buck-boost mode of operation to generate a first ramp signal beginning at a first value and increasing to a second value during a first clock cycle and generate the first ramp signal beginning at the first value and increasing to a third value during a second clock cycle following the first clock cycle and control the second ramp generator while the power converter is operating in the buck-boost mode of operation to generate a second ramp signal beginning at a fourth value and decreasing to a fifth value during the first clock cycle and generate the second ramp signal beginning at the fourth value and decreasing to a sixth value during the second clock cycle.

24 Claims, 6 Drawing Sheets

FIXED FREQUENCY BUCK-BOOST POWER CONVERTER CONTROL

SUMMARY

Aspects of the present disclosure provide for a circuit. In some examples, the circuit includes a first ramp generator, a second ramp generator, and a processing element. The processing element is configured to couple to the first ramp generator and the second ramp generator and configured to control the first ramp generator while a power converter is operating in a buck-boost mode of operation to generate a first ramp signal beginning at a first value and increasing to a second value during a first clock cycle and generate the first ramp signal beginning at the first value and increasing to a third value during a second clock cycle immediately following the first clock cycle. The processing element is further configured to control the second ramp generator while the power converter is operating in the buck-boost mode of operation to generate a second ramp signal beginning at a fourth value and decreasing to a fifth value during the first clock cycle and generate the second ramp signal beginning at the fourth value and decreasing to a sixth value during the second clock cycle.

Other aspects of the present disclosure provide for a method. In some examples, the method includes controlling a power converter to operate in a buck mode of operation, comprising controlling a buck ramp generator to generate a buck ramp signal having a value beginning at 0 and increasing to an input voltage (Vin) divided by a scaling constant (K), wherein the buck ramp signal resets to 0 once per clock cycle and controlling a boost ramp generator to generate a boost ramp signal having a value beginning at Vin/K+an output voltage (Vout) divided by K and decreasing to X1*Vin/K, wherein the boost ramp signal resets to Vin/K+ Vout/K once per clock cycle. The method also includes controlling the power converter to operate in a buck-boost mode of operation, comprising controlling the buck ramp generator to alternatingly generate the buck ramp signal having a value beginning at 0 and increasing to X3*Vin/K and having a value beginning at 0 and increasing to X4*Vin/K and controlling the boost ramp generator to alternatingly generate the boost ramp signal having a value beginning at Vin/K+Vout/K and decreasing to X1*Vin/K+ Vout/K and having a value beginning at Vin/K+Vout/K and decreasing to X2*Vin/K+Vout/K. The method also includes controlling the power converter to operate in a boost mode of operation, comprising controlling the buck ramp generator to generate the buck ramp signal having a value beginning at 0 and increasing to X4*Vin/K and controlling the boost ramp generator to generate the boost ramp signal having a value beginning at Vin/K+Vout/K and decreasing to Vin/K.

Other aspects of the present disclosure provide for a system, comprising a power converter comprising a plurality of transistors and a controller coupled to the power converter. In some examples, the controller comprises a first ramp generator, a second ramp generator, and a processing element. The processing element is configured to couple to the first ramp generator and the second ramp generator and configured to control the first ramp generator while the power converter is operating in a buck-boost mode of operation to generate a first ramp signal beginning at a first value and increasing to a second value during a first clock cycle and generate the first ramp signal beginning at the first value and increasing to a third value during a second clock cycle immediately following the first clock cycle. The processing element is further configured to control the second ramp generator while the power converter is operating in the buck-boost mode of operation to generate a second ramp signal beginning at a fourth value and decreasing to a fifth value during the first clock cycle and generate the second ramp signal beginning at the fourth value and decreasing to a sixth value during the second clock cycle.

Other aspects of the present disclosure provide for a circuit. In some examples, the circuit includes a first ramp generator, a second ramp generator, and a processing element. The processing element is configured to couple to the first ramp generator and the second ramp generator and configured to control the first ramp generator to generate a first ramp signal beginning at a first value and increasing to a second value while a power converter is operating in a first mode of operation, the first ramp signal resetting to the first value once per clock cycle. The processing element is further configured to control the second ramp generator to generate a second ramp signal beginning at a third value and decreasing to a fourth value while the power converter is operating in the first mode of operation, the second ramp signal resetting to the third value once per clock cycle.

Other aspects of the present disclosure provide for a circuit comprising a processing element. In some examples, the processing element is configured to implement a state machine for use in controlling a buck-boost power converter, monitor an internal control signal to determine whether the internal control signal crosses a buck ramp or a boost ramp during a clock cycle, and transition to a buck-boost state of the state machine when the internal control signal does not cross the buck ramp or the boost ramp during the clock cycle.

BRIEF DESCRIPTION OF THE DRAWINGS

For a detailed description of various examples, reference will now be made to the accompanying drawings in which.

DETAILED DESCRIPTION

Figure 1:
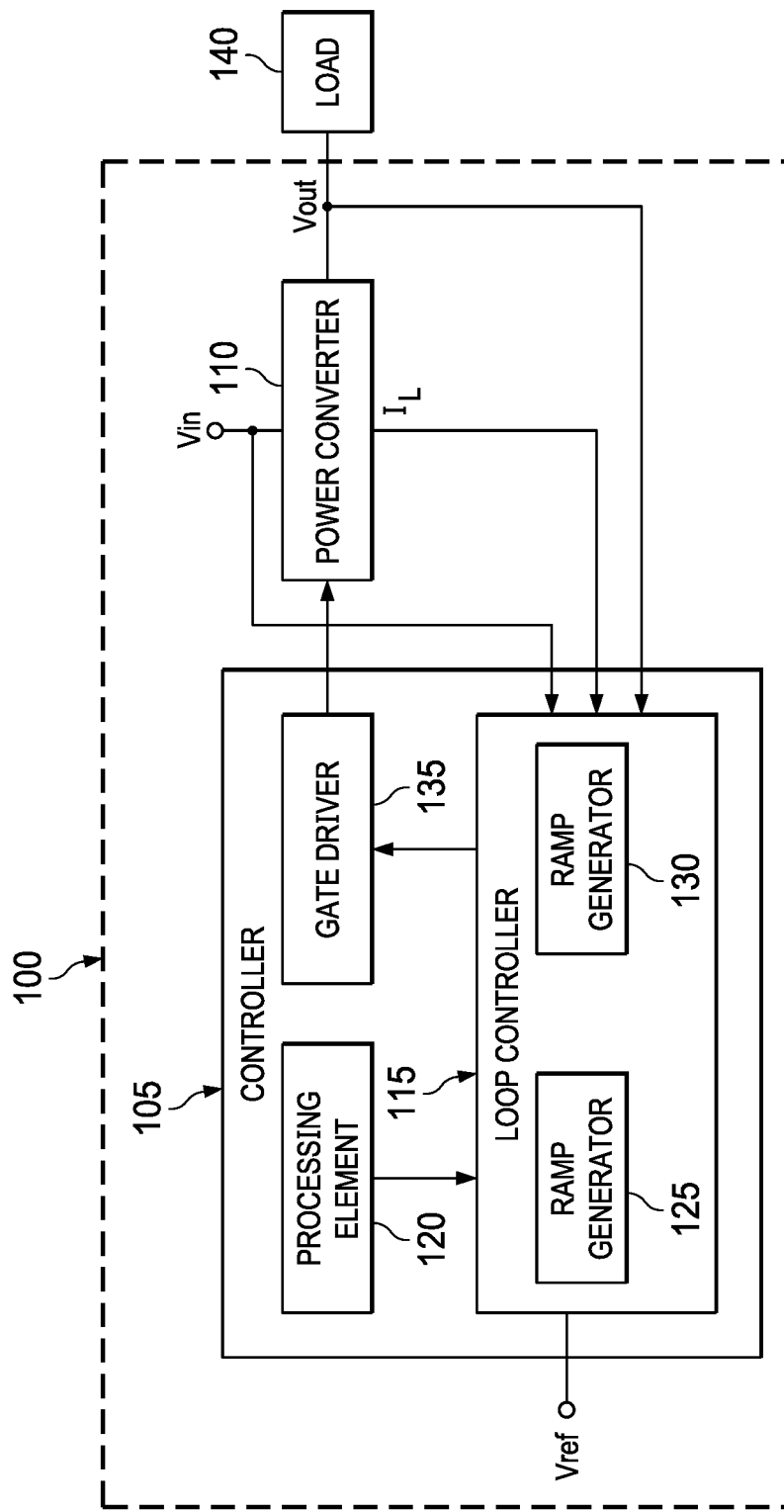
FIG. 1 shows a block diagram of an illustrative switched mode power supply (SMPS) in accordance with various examples.

A switched mode power supply (SMPS) transfers power from an input power source to a load by switching one or more power transistors coupled through a switch node/ terminal to an energy storage element (such as an inductor/ transformer and/or capacitor), which is capable of coupling to the load. The power transistors can be included in a power converter that includes, or is capable of coupling to, the energy storage element. An SMPS can include an SMPS controller to provide one or more gate drive signals to the power transistor(s). In some architectures (such as buck-boost), the SMPS includes, or is capable of coupling to, an output/bulk capacitor in parallel with the load, and the SMPS controller switches the power transistor(s) to form circuit arrangements with the energy storage element(s) to supply a load current to the load and/or to the output/bulk capacitor to maintain a regulated output voltage (e.g., by filtering the switched load current). For example, a power transistor can be coupled through the switch node/terminal to an energy storage inductor, which is switched by the SMPS controller between charge and discharge cycles to supply inductor current (e.g., current through an energy storage inductor) to the load and to the output/bulk capacitor to filter the inductor current to maintain the regulated output voltage. In some examples, an SMPS can be configured for operation as a constant current source with an energy storage element but with no output/bulk capacitor.

The power transistors can be implemented as metal oxide semiconductor field effect transistors (MOSFETs) or any other suitable solid-state transistor devices (e.g., such as bi-polar junction transistors (BJTs)). During a mode of operation of the power converter (such as a buck-boost power converter) in which a value of the input voltage (Vin) is near a value of an output voltage (Vout), sometimes referred to as a buck-boost region of operation, the power converter may oscillate between operating in a buck mode of operation and operating in a boost mode of operation to provide Vout. In at least some examples, these oscillations detrimentally affect operations of the power converter. For example, the oscillations can waste energy, thereby reducing operational efficiency of the power converter. In at least some other examples, the oscillations can introduce a frequency component to Vout at an undesired and/or unintended frequency, degrading the accuracy of Vout produced by the power converter.

At least some aspects of the present disclosure relate to a controller suitable for implementation for controlling a power converter, such as in a SMPS. In at least one example, the controller includes elements suitable for modifying a buck voltage ramp and/or a boost voltage ramp such that maximum and/or minimum value of the ramps is modified for at least some period of time by the elements of the controller. In at least some examples, the controller includes a ramp generator for generating a buck ramp, a ramp generator for generating a buck ramp, and a processing element that at least partially controls at least the ramp generators. In at least some examples, the processing element controls the ramp generators to modify the maximum and/or minimum value of the ramps generated by the ramp generators. For example, the processing element controls the ramp generators such that during the buck-boost region of operation operating points of the buck ramp and the boost ramp are manipulated to enable the controller to automatically determine an optimal region for operation of the power converter according to a defined rule set that minimizes and/or eliminates the risk of sub-harmonic oscillations between regions of operation.

Referring now to FIG. 1, a block diagram of an illustrative SMPS 100 is shown. In at least one example, the SMPS 100 includes a controller 105 and a power converter 110. The power converter 110 is, for example, a buck-boost power converter that is capable of operating in a buck-boost region. In other examples, the power converter 110 is any other type of power converter such as a buck power converter, a boost power converter, or a hybrid power converter. In at least one example, the controller 105 includes, or is configured to couple to, a loop controller 115, a processing element 120, a ramp generator 125, a ramp generator 130, and a gate driver 135. At least one example of the SMPS 100 includes at least some aspects of the controller 105 and the power converter 110 on a same semiconductor die and/or in a same component package, while in other examples the controller 105 and the power converter 110 may be fabricated separately and configured to couple together. For example, at least some aspects of the controller 105 may be fabricated separately and coupled together. Accordingly, while illustrated as including the gate driver 135, in at least one example the controller 105 does not include the gate driver 135 and instead is configured to couple to the gate driver 135.

In at least one example, the SMPS 100 is configured to receive Vin from an input power source (not shown) and provide Vout at an output terminal based at least partially on the input voltage and a reference voltage (Vref) received by the SMPS 100. Vref may be received from any suitable device (not shown) such as a processor, microcontroller, or any other device exerting control over the SMPS 100 to control a value of Vout and may be, or be representative of, a predetermined (e.g., user-desired, target, preconfigured, programmed, etc.) value for Vout. The SMPS 100, in at least one example, provides Vout to a load 140 that is coupled to the SMPS 100 (e.g., coupled to the SMPS 100 at an output of the power converter 110). In at least one example, the controller 105 receives one or more signals from the power converter 110. For example, the controller 105 may receive Vout from the power converter 110 and/or a value representative of an inductor current (IL) of the power converter 110. In various examples, the value representative of IL may be a value directly measured from an inductor (not shown) of the power converter 110 (or a terminal of another component of the power converter 110 to which the inductor is also coupled) or a value sensed from a sense element (not shown) of the power converter 110. The sense element is, for example, a sense resistor, a transistor, or any other component or combination of components capable of measuring IL of the power converter 110 and providing the value representative of IL to the controller 105.

In at least one example, the loop controller 115 is coupled to the gate driver 135 and the power converter 110 and is configured to receive Vref and Vout, for example, at least partially for use in controlling the gate driver 135. In another example, the loop controller 115 further receives the value representative of IL from the sense element of the power converter 110 further for use in controlling the gate driver 135. In yet another example, the loop controller 115 includes a processing element 120, a ramp generator 125, and a ramp generator 130. The processing element 120 controls the ramp generator 125 and the ramp generator 130 to generate ramp signals (e.g., controls the ramp generator 125 to generate a buck ramp and controls the ramp generator 130 to generate a boost ramp) for use by the loop controller 115 in controlling the gate driver 135. In at least some examples, although not shown in FIG. 1, the processing element 120 is further configured to couple to at least some other components of the SMPS 100 and receive one or more of Vref, Vout, and or IL.

Based on the received inputs (e.g., Vin, Vout, the value representative of IL, and/or Vref) and outputs of the ramp generator 125 and ramp generator 130, the loop controller 115 controls the gate driver 135 to control power transistors (not shown) of the power converter 110 to generate Vout. In at least one example, the loop controller 115 controls the gate driver 135 to control the power converter 110 to operate in the buck mode of operation when an internal control signal (e.g., determined according to Vin, Vout, the value representative of IL, and/or Vref) exceeds a value of the buck ramp and controls the gate driver 135 to control the power converter 110 to operate in the boost mode of operation when the internal control signal exceeds a value of the boost ramp. In at least one example, the internal control signal is a scaled representation of Vout. In other examples, the internal control signal is a result determined by a differential amplifier accepting as inputs a representation of IL and a result determined by another differential amplifier accepting as inputs Vref and a scaled representation of Vout. In at least some examples, the processing element 120 additionally, or alternatively, provides a measure of control to the gate driver 135 for controlling the control the power converter 110. Accordingly, in at least some examples, although not shown in FIG. 1 the processing element 120 is configured to receive at least some of Vin, Vout, the value representative of IL, and/or Vref.

For example, in at least one implementation the loop controller 115 compares Vout (or a scaled version of Vout, such as scaled via a voltage divider) to Vref. A result of the comparison is compared to the value representative of IL. A result of that comparison is, for example, the internal control signal to which the buck ramp and the boost ramp are compared. In various examples, the loop controller 115 includes any suitable circuitry or components for controlling the gate driver 135 to control the power converter 110 at a fixed (e.g., constant) switching frequency (fsw), as disclosed herein.

In at least one example, the loop controller 115 may comprise one or more comparators (not shown). In another example, the loop controller 115 may further include, or be coupled to, a voltage divider (not shown) that may scale the value of Vout. In another example, the loop controller 115 may further include one or more supporting components (not shown) such as resistors, capacitors, diodes, and the like, a scope of which is not limited herein. In at least some examples, the ramp generator 125 and the ramp generator 130 may each be, for example, a resistor-capacitor (RC) timer or other form of timer, a scope of which is not limited herein. In at least some examples, a resistor (not shown) and/or a capacitor (not shown) of the RC timer is controllable to control a value of resistance of the resistor or a value of capacitance of the capacitor, for example, to manipulate and/or alter a value of the buck ramp and/or the boost ramp, as discussed herein. Generally, the ramp generator 125 and the ramp generator 130 each include any suitable elements appropriate for generating a controllable ramp signal. In some examples, the loop controller 115 may provide any number of control signals to the gate driver 135 to control the gate driver 135.

In various examples, the gate driver 135 is any suitable driver, component, or combination of components for controlling the power converter 110 (e.g., by coupling to, and exerting control on, gate terminals of the power transistors of the power converter 110). In at least one example, the gate driver 135 includes at least one driver (not shown) configured to generate a high-current control gate drive signal based on a received input signal. For example, when the gate driver 135 receives a first input signal from the loop controller 115, the gate driver 135 may control a first subset of power transistors of the power converter 110 to turn (or remain) on while controlling a remainder of the power transistors of the power converter 110 to remain (or turn) off. When the gate driver 135 receives a second input signal from the loop controller 115, the gate driver 135 may control a second subset of the power transistors of the power converter 110 to turn (or remain) on and a remainder of the power transistors of the power converter 110 to remain (or turn) off. When the power converter 110 is operating in the buck-boost region (e.g., alternating between one clock cycle of operation in the buck mode (a buck cycle) followed by one clock cycle of operation in the boost mode (a boost cycle), and repeating), in some examples, the gate driver 135 may control the power converter 110 to generate a trapezoidal inductor current waveform, for example, based on control exerted on the gate driver 135 by the loop controller 115.

Figure 2:
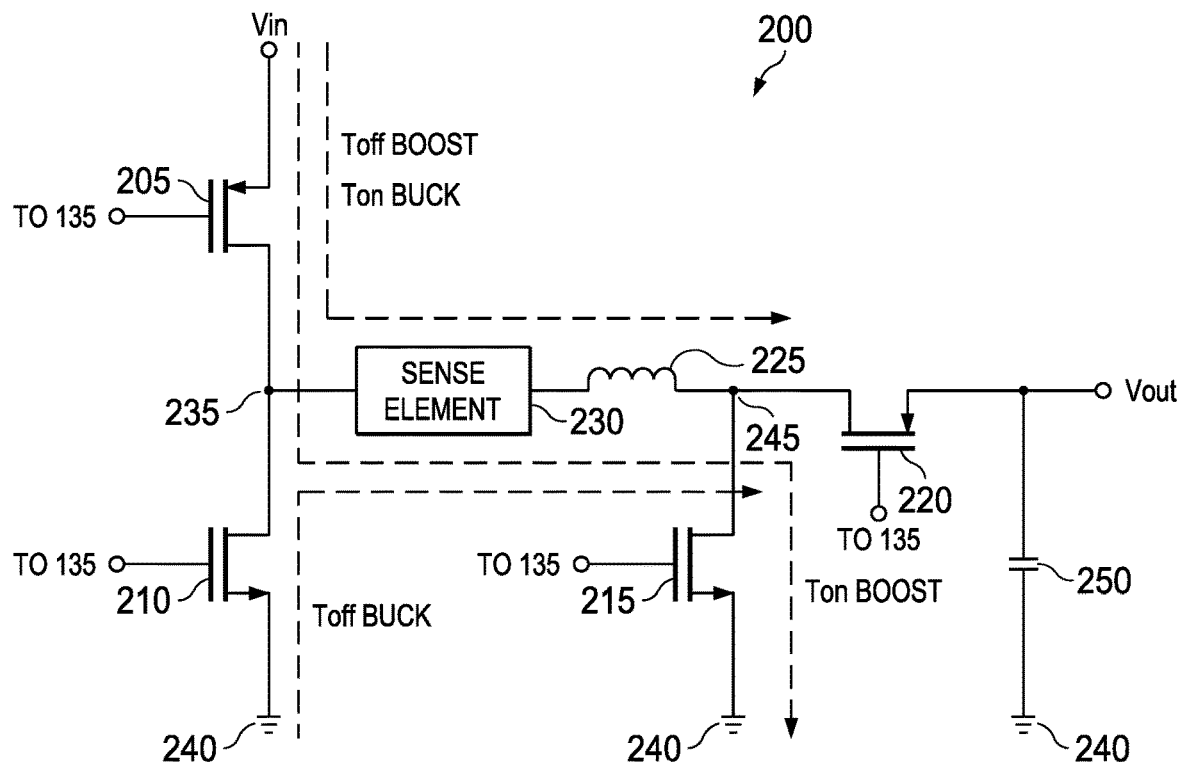
FIG. 2 shows a schematic diagram of an illustrative buck-boost power converter in accordance with various examples.

Referring now to FIG. 2, a schematic diagram of an illustrative buck-boost power converter 200 is shown. In at least one example, the buck-boost power converter 200 is suitable for implementation as the power converter 110 of the SMPS 100 of FIG. 1, discussed above. In one example, the buck-boost power converter 200 includes a plurality of metal oxide semiconductor field effect transistors (MOSFETs) 205, 210, 215, and 220, and at least one energy storage device (illustrated in this example as an inductor 225). In another example, the buck-boost power converter 200 further includes a second inductor (not shown) and/or a fly-capacitor (not shown). In one example, the MOSFETs 205 and 220 are implemented as p-type MOSFETs (PMOS) and the MOSFETs 210 and 215 are implemented as n-type MOSFETs (NMOS). In at least one example, the buck-boost power converter 200 further includes a sense element 230 suitable for sensing IL of the inductor 225. The sense element 230 is, for example, a MOSFET, a resistor, or any other suitable means of sensing, measuring, or detecting IL. In at least one example, the sense element 230 is implemented by one of the MOSFETs 205, 210, 215, or 220 such that the sense element 230 is not an independent, additional component of the buck-boost power converter 200.

In one example architecture, a source terminal of the MOSFET 205 is configured to receive Vin, a drain terminal of the MOSFET 205 is coupled to a node 235, and a gate terminal of the MOSFET 205 is coupled to a controller (e.g., such as the gate driver 135 of the controller 105 of the SMPS 100 of FIG. 1, discussed above). A drain terminal of the MOSFET 210 is coupled to the node 235, a source terminal of the MOSFET 210 is coupled to a ground node 240, and a gate terminal of the MOSFET 210 is coupled to the controller. A first terminal of the inductor 225 is coupled to the node 235 and a second terminal of the inductor 225 is coupled to a node 245. In at least one example, the sense element 230 is coupled in series between node 235 and the first terminal of the inductor 225. In another example, a drain terminal of the MOSFET 215 is coupled to the node 245, a source terminal of the MOSFET 215 is coupled to the ground node 240, and a gate terminal of the MOSFET 215 is coupled to the controller. A drain terminal of the MOSFET 220 is coupled to the ground node 240, a source terminal of the MOSFET 220 provides Vout from the buck-boost power converter 200 (e.g., such that the source terminal of the MOSFET 220 is configured to couple to a load (not shown)), and a gate terminal of the MOSFET 220 is coupled to the controller. In at least one example, the inductor 225 is implemented as an external component such that the buck-boost power converter 200 does not include the inductor 225 but is configured to couple to the inductor 225 between the node 235 and the node 245. In at least one example, the buck-boost power converter 200 is configured to couple to a capacitor 250 (e.g., such as a filtering capacitor) between the source terminal of the MOSFET 220 and the ground node 240.

In one example, the MOSFETs 205, 210, 215, and/or 220 are controlled to turn on (e.g., conduct current between their respective drain terminals and source terminals) and/or turn off (e.g., cease conducting current between their respective drain terminals and source terminals) based on a signal received at their respective gate terminals. For example, based on a signal (e.g., a control signal) received from the controller, one or more of the MOSFETs 205, 210, 215, and/or 220 are controlled to turn on or turn off. The MOSFETs 205, 210, 215, and/or 220 may turn on (or off) based on a value, or relationship between values, present at one or more of the respective gate terminals and/or source terminals of the MOSFETs 205, 210, 215, and/or 220.

As further illustrated in FIG. 2, in at least one example the buck-boost power converter 200 is configured to operate in a buck cycle or a boost cycle. The buck cycle includes a buck-on phase (illustrated as TonBuck) and a buck-off phase (illustrated as ToffBuck) and the boost cycle includes a boost-on phase (illustrated as TonBoost) and a boost-off phase (illustrated as ToffBoost).

During TonBoost, MOSFETs 205 and 215 are controlled by the controller to be turned on while MOSFETs 210 and 220 are controlled by the controller to be turned off. During TonBoost, a path from Vin to ground is formed through the MOSFET 205, inductor 225, and MOSFET 215, thereby enabling the inductor 225 to charge from Vin. During ToffBuck, MOSFETs 205 and 215 are controlled by the controller to be turned off while the MOSFETs 210 and 220 are controlled by the controller to be turned on. During ToffBuck, a path from the ground node 240 to a node (e.g., the source terminal of the MOSFET 220) of the buck-boost power converter 200 to which a load may couple to receive Vout is formed through the MOSFET 210, inductor 225, and MOSFET 220, thereby enabling the inductor 225 to discharge to provide Vout. During ToffBoost and Ton Buck, MOSFETs 205 and 220 are controlled by the controller to be turned on and the MOSFETs 210 and 215 are controlled by the controller to be turned off. During ToffBoost and Ton-Buck, Vin and Vout have approximately the same value such that a voltage difference across the inductor 225 is minimal. When the voltage difference across the inductor 225 is minimal, in at least one example the inductor 225 may function approximately as a short between Vin and Vout with minimal effects on the value of Vout.

Figure 3:
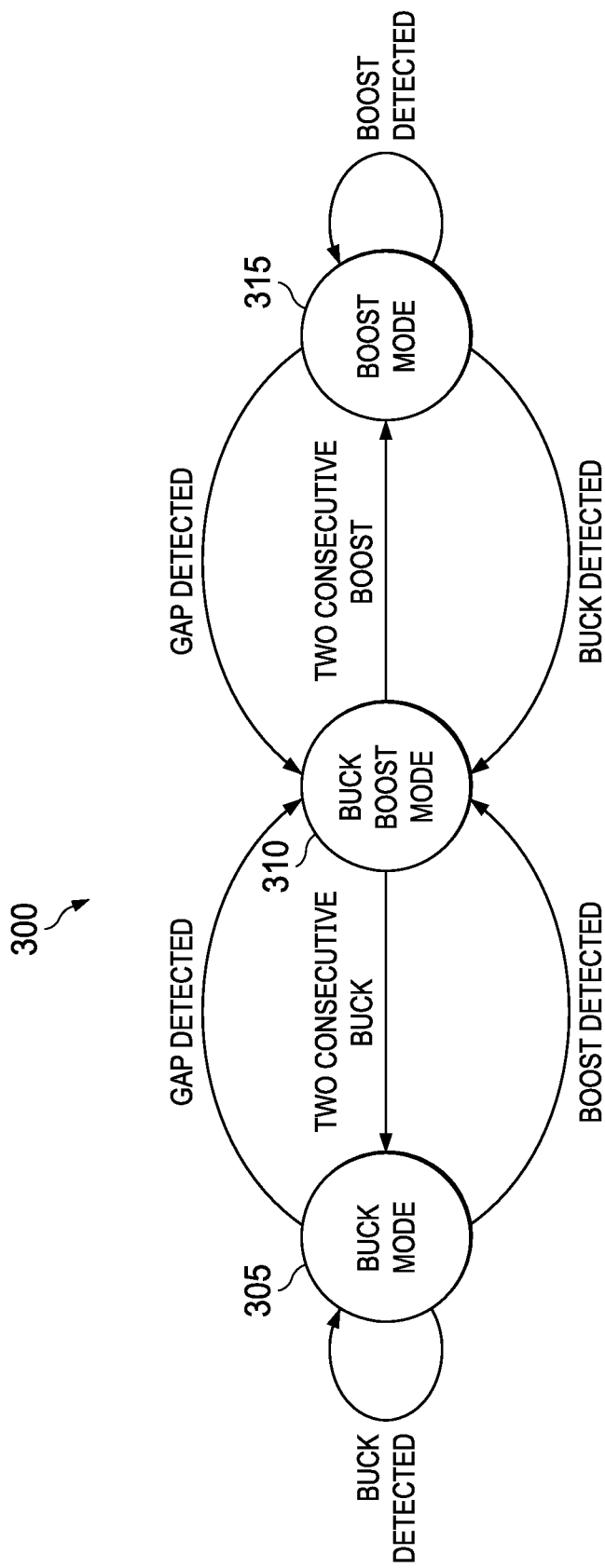
FIG. 3 shows an illustrative state diagram in accordance with various examples.

Turning now to FIG. 3, an illustrative state diagram 300 is shown. In at least some examples, the state diagram 300 illustrates operations of (and therefore in at least some examples is implemented by) the controller 105 of the SMPS 100 of FIG. 1. In at least some examples, the state diagram 300 indicates rules and/or conditions for controlling a power converter, such as the power converter 110 of the SMPS 100, to operate in a buck mode of operation, a boost mode of operation, or a buck-boost mode of operation. For the purposes of description, it is assumed that Vin is greater than Vout and therefore operation according to the state diagram 300 begins at state 305. However, if instead Vin is less than Vout when operation according to the state diagram 300 begins, the operation according to the state diagram 300 would begin at state 310.

At state 305, the power converter is controlled to operate in a buck mode of operation. While operating in the buck mode of operation, a signal BUBO is set to a low value to indicate that the power converter is not operating in a buck-boost mode of operation. When the controller detects that the power converter performs a buck cycle of operation while in state 305, the controller controls the power converter to continue operating according to state 305. When the controller detects that a gap detection has occurred, the controller controls the power converter to operate according to state 310. In at least some examples, a gap detection is defined as the internal control signal of the power converter not crossing the ramp generated by the ramp generator 125 of the SMPS 100 or the ramp generated by the ramp generator 130 of the SMPS 100 while a clock signal (CLK) has a logic-level low value (e.g., the internal control signal having a value existing in a gap between the ramp generated by the ramp generator 125 and the ramp generated by the ramp generator 130 while CLK has the logic-level low value). When the controller detects that the power converter performs a boost cycle while in state 305, the controller controls the power converter to operate according to state 310.

At state 310, the power converter is controlled to operate in a buck-boost mode of operation. While operating in the buck-boost mode of operation, BUBO is set to a high value to indicate that the power converter is operating in the buck-boost mode of operation. When the controller detects that the power converter performs two consecutive buck cycles of operation while in state 310, the controller controls the power converter to return to operating according to state 305. When the controller detects that the power converter performs two consecutive boost cycles of operation while in state 310, the controller controls the power converter to operate according to state 315.

At state 315, the power converter is controlled to operate in a boost mode of operation. While operating in the boost mode of operation, BUBO is set to a low value to indicate that the power converter is not operating in the buck-boost mode of operation. When the controller detects that the power converter performs a boost cycle of operation while in state 315, the controller controls the power converter to continue operating according to state 315. When the controller detects that a gap detection has occurred, the controller controls the power converter to operate according to state 310. When the controller detects that the power converter performs a buck cycle while in state 315, the controller controls the power converter to operate according to state 310.

In at least some examples, while operating according to the state diagram 300, the controller is subject to a plurality of operating rules to provide for efficient operation in buck, boost, and buck-boost modes of operation while avoiding sub-harmonic oscillation between modes of operation. For example, the rules provide for manipulation of the ramp generated by the ramp generator 125 and the ramp generated by the ramp generator 130, as discussed herein, as well as control of internal signals that aid in controlling the power converter. In at least some examples, the state diagram 300 and associated rules are representative of a control scheme in a fixed frequency system where CLK has a fixed frequency. In at least some examples, each cycle of CLK has a 50 nanosecond (ns) high phase. In other examples, the high phase of CLK has any suitable value as determined by a desired operation of the controller and/or the power converter.

In at least some examples, the buck ramp and the boost ramp are each reset (e.g., the buck ramp reset to 0 and the boost ramp reset to about Vin/K, where K is a scaling constant) when CLK has a high value. When CLK has a low value, the buck ramp increases in value from 0 to about Vin/K while in the state 305 and increases from 0 to about 0.8*Vin/K while in the state 315. While in state 310 and CLK has a low value, if operation proceeded to state 310 from state 305, the buck ramp increases in value from 0 to about 0.8*Vin/K and if operation proceeded to state 310 from state 315, the buck ramp increases in value from 0 to about 1.1*Vin/K. Similarly, when CLK has a low value, the boost ramp decreases in value from about Vin/K+Vout/K to about Vin/K while in the state 315 and decreases from about Vin/K+Vout/K to about 1.2*Vin/K while in the state 305. While in state 310 and CLK has a low value, if operation proceeded to state 310 from state 305, the boost ramp decreases in value from about Vin/K+Vout/K to about 0.9*Vin/K and if operation proceeded to state 310 from state 315, the boost ramp decreases in value from about Vin/K+Vout/K to about 1.2*Vin/K. In at least some examples, the scaling constant K has any suitable value dictated by an implementation of the controller and/or the power converter, and in at least some examples K is 2.

In at least some examples, a state signal BUH_BOL has a high value following a buck cycle of operation and has a low value following a boost cycle of operation. For example, while operating in state 305 BUH_BOL remains high, while operating in state 315 BUH_BOL remains low, and while operating in state 310 BUH_BOL alternates between high and low values. Generally, during a buck cycle the internal control signal crosses the buck ramp and during a boost cycle the internal control signal crosses the boost ramp. When the internal control signal crosses neither the buck ramp nor the boost ramp, the controller determines that a gap detection has occurred and a signal GAP_DETECT has a high value for one clock cycle. When GAP_DETECT has a high value and BUH_BOL has a low value, the controller controls the power converter to force a minimum buck off-time beginning with a next rising edge of CLK following the rising edge of GAP_DETECT. When GAP_DETECT has a high value and BUH_BOL has a high value, the controller controls the power converter to force a minimum boost on-time beginning with a next rising edge of CLK following the rising edge of GAP_DETECT. When BUBO has a low value, a rising edge of GAP_DETECT causes a corresponding rising edge to occur in BUBO and a falling edge occurs in BUBO after two consecutive buck cycles occur or after two consecutive boost cycles occur.

Figure 4:
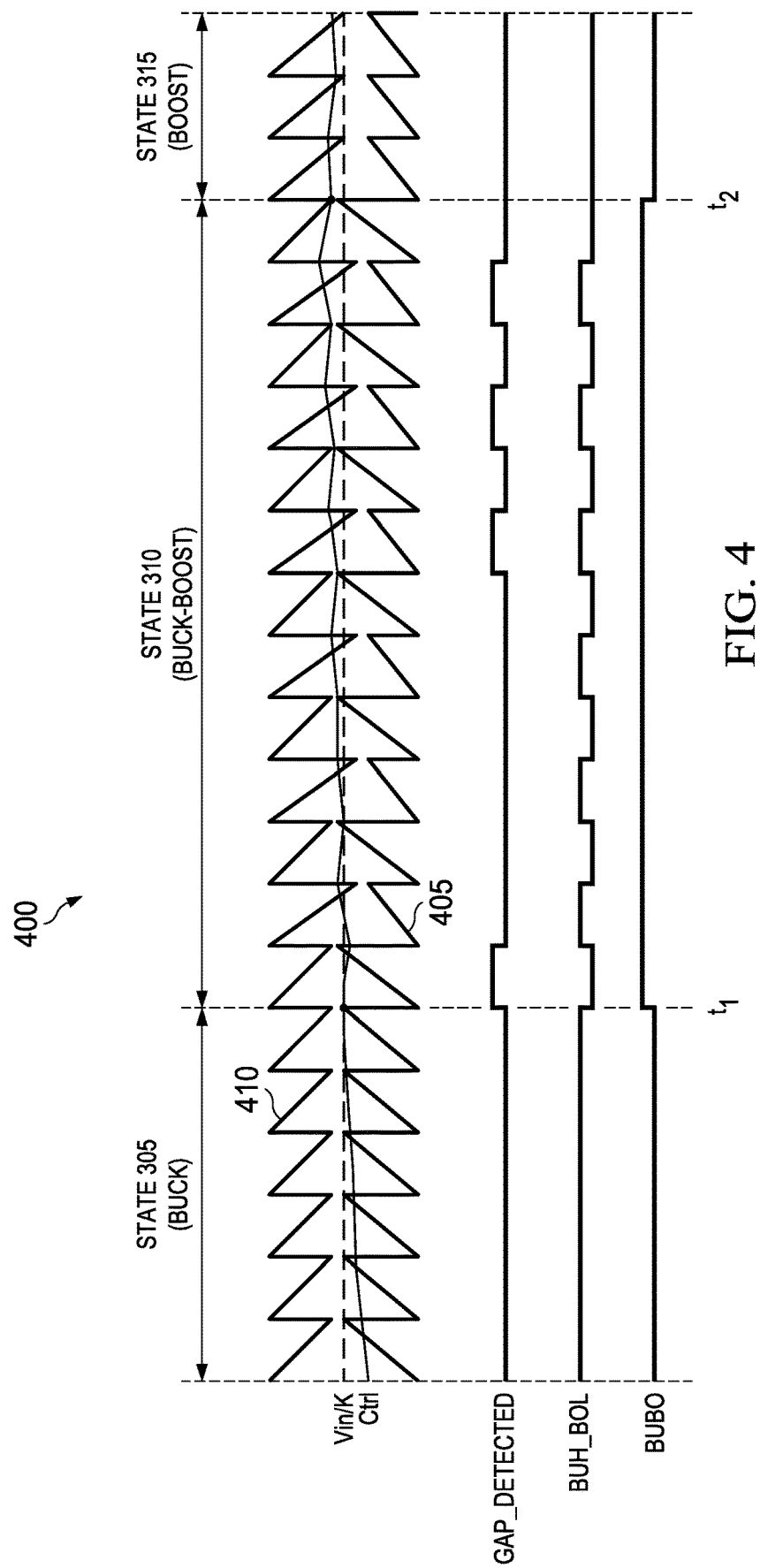
FIG. 4 shows a diagram of illustrative waveforms in accordance with various examples.

Turning now to FIG. 4, a diagram 400 of illustrative waveforms is shown. In at least some examples, the diagram 400 graphically illustrates operation of a system, such as the SMPS 100 of FIG. 1, operating according to the state diagram 300 of FIG. 3 and its associated rules, discussed above. For example, the diagram 400 illustrates operation beginning in state 305 (e.g., Vout less than Vin), transitioning to state 310 (e.g., Vout approximately equal to Vin), and finally transitioning to state 315 (e.g., Vout greater than Vin), while operating within the bounds and subject to the parameters set forth in the rules associated with the state diagram 300 to create regular, predictable operation while in the state 310.

As shown in diagram 400, while operating in state 305, the buck ramp 405 increases from about 0 volts (V) to about Vin/2 V and Vout crosses the buck ramp 405 while CLK is low during each clock cycle. During this same period, the controller scales the boost ramp 410 so that a minimum value of the boost ramp 410 is greater than Vin/2 and no overlap occurs between the boost ramp 410 and the buck ramp 405. Additionally, while operating in state 305, BUH_BOL has a high value, BUBO has a low value, and GAP_DETECT has a low value each time the internal control signal (Ctrl) crosses the buck ramp 405 while CLK is low. At time t1, a gap detection is detected at which the internal control signal does not cross the buck ramp 405 or the boost ramp 410, indicating a transition in operation according to the state diagram 300 from state 305 to state 310.

While operating in the state 310, as shown in diagram 400 the controller controls the buck ramp 405 to alternate with each clock cycle between a maximum value greater than Vin/2 and a maximum value less than Vin/2 while simultaneously controlling the boost ramp 410 to alternate with each clock cycle between a minimum value greater than Vin/2 and a minimum value less than Vin/2. In this way, the controller's manipulation of the buck ramp 405 and the boost ramp 410 creates a predictable pattern of alternating buck cycles and boost cycles while operating in state 310, mitigating the operational oscillations and uncertainty previously common to buck-boost modes of operation of power converters. Additionally, as shown in the diagram 400 and discussed previously, BUH_BOL alternates in value during operation in state 310, indicating an immediately preceding mode of operation (e.g., BUH-BOL has a low value following a boost cycle and has a high value following a buck cycle) and BUBO has a high value to indicate that operation according to state 310 (e.g., a buck-boost mode of operation that alternates consecutively between buck and boost cycles) is being performed. In at least some examples, rising edges in GAP_DETECT occurring while BUBO has a high value are ignored. At time t2, the internal control signal crosses the boost ramp 410 for the second of two consecutive clock cycles, causing a falling edge in BUBO and indicating a transition in operation according to the state diagram 300 from state 310 to state 315.

While operating in state 315, the boost ramp 410 decreases from about Vin/2+Vout/2 V to about Vin/2 V and the internal control signal crosses the boost ramp 410 while CLK is low during each clock cycle. During this same period, the controller scales the buck ramp 405 so that a maximum value of the buck ramp 405 is less than Vin/2 and no overlap occurs between the buck ramp 405 and the boost ramp 410. Additionally, while operating in state 315, BUH_BOL has a low value, BUBO has a low value, and GAP_DETECT has a low value each time the internal control signal crosses the boost ramp 410 while CLK is low.

As illustrated in the diagram 400, the state diagram 300 and its associated rules for manipulating the buck ramp 405, the boost ramp 410, and controlling values of GAP_DETECT, BUH_BOL, and BUBO, described above with respect to FIG. 3, provide for an orderly, predictable, and standardized entry by a power converter into a buck-boost mode of operation, operation while in the buck-boost mode of operation, and exit from the buck-boost mode of operation that prevents or mitigates unpredictable behavior and/or oscillations between modes of operation of the power converter.

While Vin/K is illustrated in FIG. 4 as a consistent, straight line, in practice Vin/K will vary as Vin changes (e.g., as Vin increases and/or decreases). Vin/K is illustrated in FIG. 4 as a consistent, straight line for easy in explaining and understanding the controlling and manipulation of the buck ramp 405 and the boost ramp 410 with respect to the Vin/K.

Figure 5:
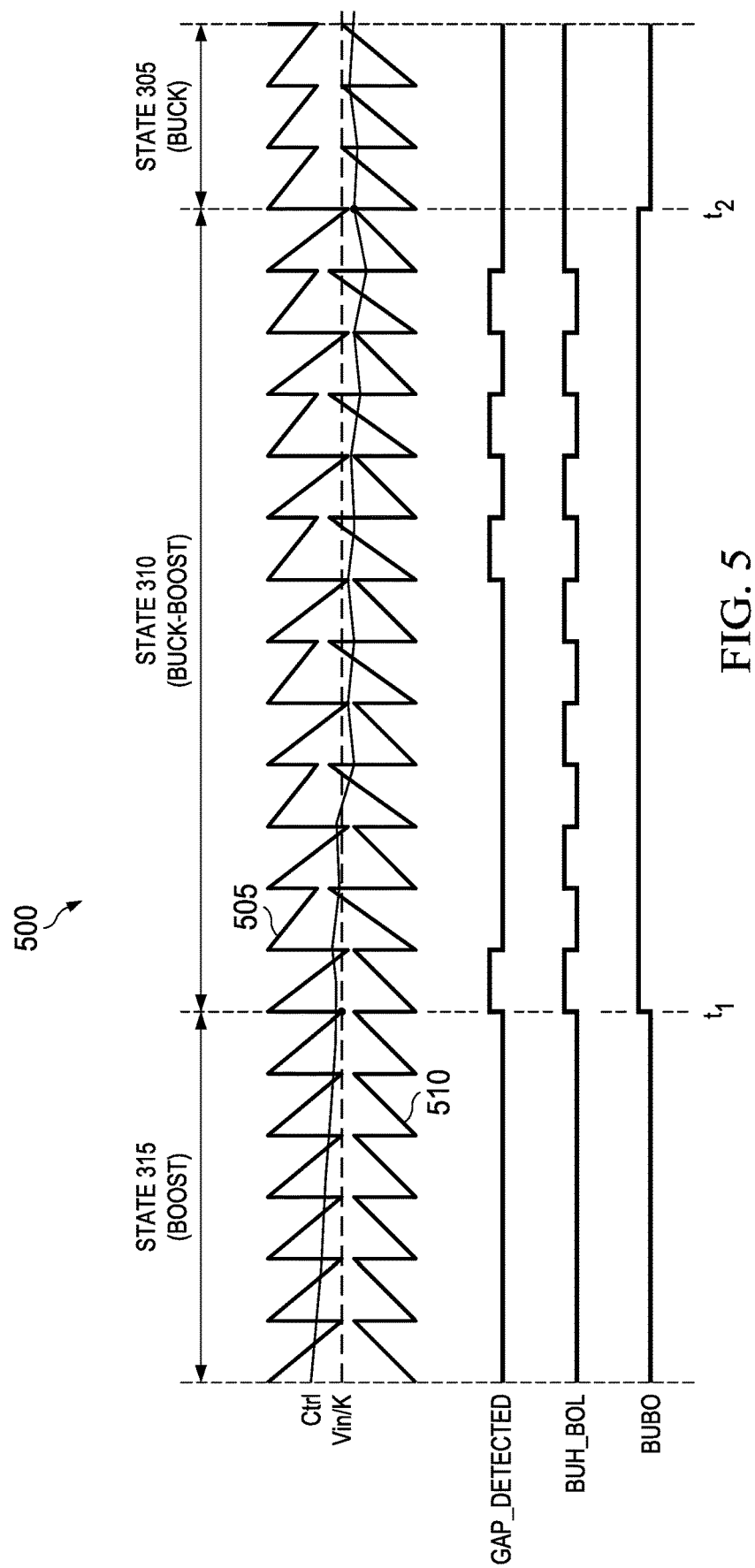
FIG. 5 shows a diagram of illustrative waveforms in accordance with various examples.

Turning now to FIG. 5, a diagram 500 of illustrative waveforms is shown. In at least some examples, the diagram 500 graphically illustrates operation of a system, such as the SMPS 100 of FIG. 1, operating according to the state diagram 300 of FIG. 3 and its associated rules, discussed above. For example, the diagram 500 illustrates operation beginning in state 315 (e.g., Vout greater than Vin), transitioning to state 310 (e.g., Vout approximately equal to Vin), and finally transitioning to state 305 (e.g., Vout less than Vin), while operating within the bounds and subject to the parameters set forth in the rules associated with the state diagram 300 to create regular, predictable operation while in the state 310.

As shown in diagram 500, while operating in state 315, the boost ramp 505 decreases from about Vin/2+Vout/2 V to about Vin/2 V and the internal control signal (Ctrl) crosses the boost ramp 505 while CLK is low during each clock cycle. During this same period, the controller scales the buck ramp 510 so that a maximum value of the buck ramp 510 is less than Vin/2 and no overlap occurs between the buck ramp 510 and the boost ramp 505. Additionally, while operating in state 315, BUH_BOL has a low value, BUBO has a low value, and GAP_DETECT has a low value each time the internal control signal crosses the boost ramp 505 while CLK is low. At time t1, a gap detection is detected at which the internal control signal does not cross the boost ramp 505 or the buck ramp 510, indicating a transition in operation according to the state diagram 300 from state 315 to state 310.

While operating in the state 310, as shown in diagram 500 the controller controls the boost ramp 505 to alternate with each clock cycle between a minimum value greater than Vin/2 and a minimum value less than Vin/2 while simultaneously controlling the buck ramp 510 to alternate with each clock cycle between a maximum value greater than Vin/2 and a maximum value less than Vin/2. In this way, the controller's manipulation of the boost ramp 505 and the buck ramp 510 creates a predictable pattern of alternating buck cycles and boost cycles while operating in state 310, mitigating the operational oscillations and uncertainty previously common to buck-boost modes of operation of power converters. Additionally, as shown in the diagram 500 and discussed previously, BUH_BOL alternates in value during operation in state 310, indicating an immediately preceding mode of operation (e.g., BUH-BOL has a low value following a boost cycle and has a high value following a buck cycle) and BUBO has a high value to indicate that operation according to state 310 (e.g., a buck-boost mode of operation that alternates consecutively between buck and boost cycles) is being performed. In at least some examples, rising edges in GAP_DETECT occurring while BUBO has a high value are ignored. At time t2, the internal control signal crosses the buck ramp 510 for the second of two consecutive clock cycles, causing a falling edge in BUBO and indicating a transition in operation according to the state diagram 300 from state 310 to state 305.

While operating in state 305, the buck ramp 510 increases from about 0 V to about Vin/2 V and the internal control signal crosses the buck ramp 510 while CLK is low during each clock cycle. During this same period, the controller scales the boost ramp 505 so that a minimum value of the boost ramp is greater than Vin/2 and no overlap occurs between the boost ramp 505 and the buck ramp 510. Additionally, while operating in state 305, BUH_BOL has a high value, BUBO has a low value, and GAP_DETECT has a low value each time the internal control signal crosses the buck ramp 510 while CLK is low.

As illustrated in the diagram 500, the state diagram 300 and its associated rules for manipulating the boost ramp 505, buck ramp 510, and controlling values of GAP_DETECT, BUH_BOL, and BUBO, described above with respect to FIG. 3, provide for an orderly, predictable, and standardized entry by a power converter into a buck-boost mode of operation, operation while in the buck-boost mode of operation, and exit from the buck-boost mode of operation that prevents or mitigates unpredictable behavior and/or oscillations between modes of operation of the power converter.

While Vin/K is illustrated in FIG. 5 as a consistent, straight line, in practice Vin/K will vary as Vin changes (e.g., as Vin increases and/or decreases). Vin/K is illustrated in FIG. 5 as a consistent, straight line for easy in explaining and understanding the controlling and manipulation of the boost ramp 505 and the buck ramp 510 with respect to the Vin/K.

Figure 6:
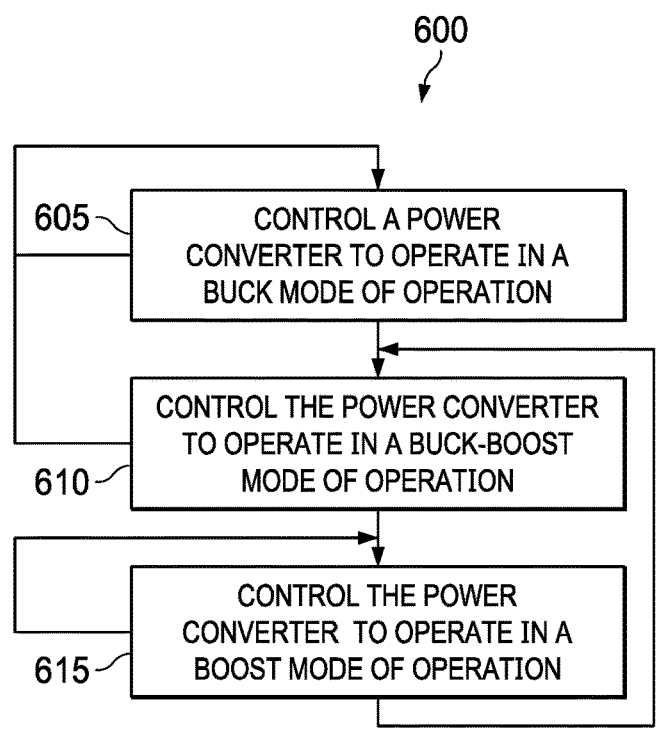
FIG. 6 shows a flowchart of an illustrative method in accordance with various examples.

Turning now to FIG. 6, a flowchart of an illustrative method 600 is shown. In at least some examples, the method 600 is representative of operation of a controller controlling a power converter subject to the state diagram 300 and its associated rules for manipulating the buck ramp 405, boost ramp 410, boost ramp 505, and/or buck ramp 510, and for controlling values of GAP_DETECT, BUH_BOL, and BUBO, as described above with respect to FIG. 3, FIG. 4, and/or FIG. 5. For the purposes of discussion, it is assumed that Vin is greater than Vout at the beginning of operation of the method 600 and Vin decreases to less than Vout through operation of the method 600. However, in some examples Vin instead may be less than Vout at the beginning of operation of the method 600 and Vin increases to greater than Vout through operation of the method 600. In such an example, operation of the method 600 may be substantially reversed, as would be understood in view of the preceding discussions of state diagram 300, diagram 400, and diagram 500.

Figure 7:
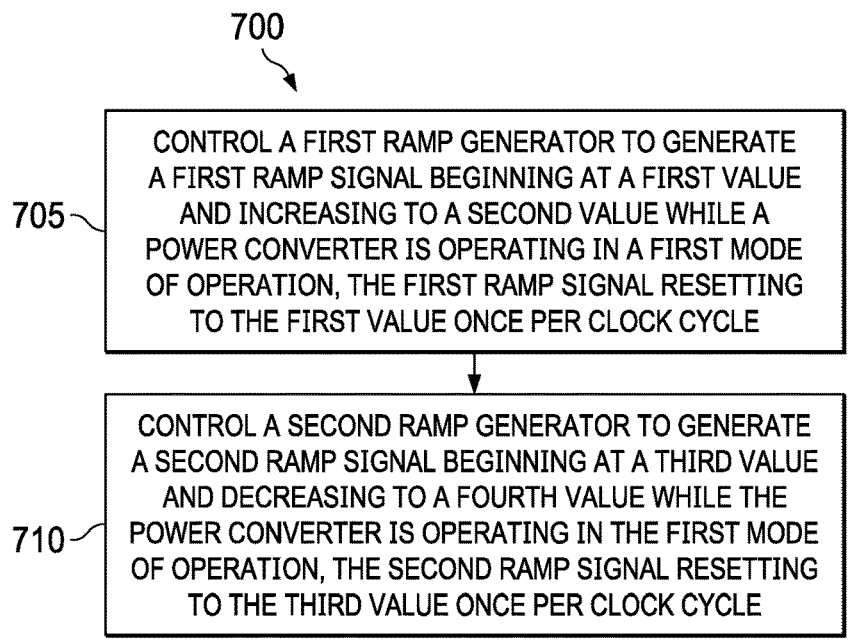
FIG. 7 shows a flowchart of an illustrative method in accordance with various examples.

At operation 605, the controller controls a power converter to operate in a buck mode of operation (e.g., in which a buck cycle is followed by another buck cycle). While operating in the buck mode of operation, in at least some examples, the controller manipulates a boost ramp of the controller such that a minimum value of the boost ramp is increased. Turning for a moment to FIG. 7, a flowchart of an illustrative method 700 of control of a power converter while operating in the buck mode of operation is shown. In at least some examples, the method 700 is a sub-method, describing operations of the controller during operation 605 of the method 600. At operation 705, the controller controls a first ramp generator, such as a buck ramp generator, to generate a first ramp signal beginning at a first value and increasing to a second value while a power converter is operating in a first mode of operation, the first ramp signal resetting to the first value once per clock cycle. In at least some examples, the first value is about 0 and the second value is about Vin/K. At operation 710, the controller controls a second ramp generator, such as a boost ramp generator, to generate a second ramp signal beginning at a third value and decreasing to a fourth value while the power converter is operating in the first mode of operation, the second ramp signal resetting to the third value once per clock cycle. In at least some examples, while the controller determines that the power converter is in the buck mode of operation, after operation 710 the controller begins again at operation 705 and repeats the method 700. In at least some examples, the third value is about Vin/K+Vout/K and the fourth value is greater than about Vin/K.

In at least some examples, the controller controls the boost ramp generator to modify the boost ramp such that a minimum value of the boost ramp is greater than Vin/K and the boost ramp decreases each clock cycle from about Vin/K+Vout/K to about X1*Vin/K during operation 710, where X1 is a value greater than 1. Additionally, the controller controls the buck ramp generator such that the buck ramp increases each clock cycle from about 0 to about Vin/K during operation 705. Returning now to FIG. 6, while operating in the buck mode of operation the controller additionally controls a value of a BUH_BOL signal to have a high value, a value of a BUBO signal to have a low value, and a value of a GAP_DETECT signal to have a low value unless the controller determines that the internal control signal crosses neither the buck ramp nor the boost ramp while CLK has a low value. In at least one example, the controller controls the power converter to continue operating in the buck mode of operation until an exit condition occurs. The exit conditions include, for example, occurrence of a gap detection (e.g., as indicated by a rising edge in a GAP_DETECT signal) or detection of a boost cycle occurring while operating in the buck mode of operation. For example, if a large value and/or sudden or sharp change occurs in Vin or a load receiving Vout while operating in the buck mode of operation, a loop controller may directly control the power converter to perform a boost cycle despite the controller indicating operating in the buck mode of operation for one additional clock cycle. When an exit condition occurs, the method 600 proceeds from operation 605 to operation 610.

Figure 8:
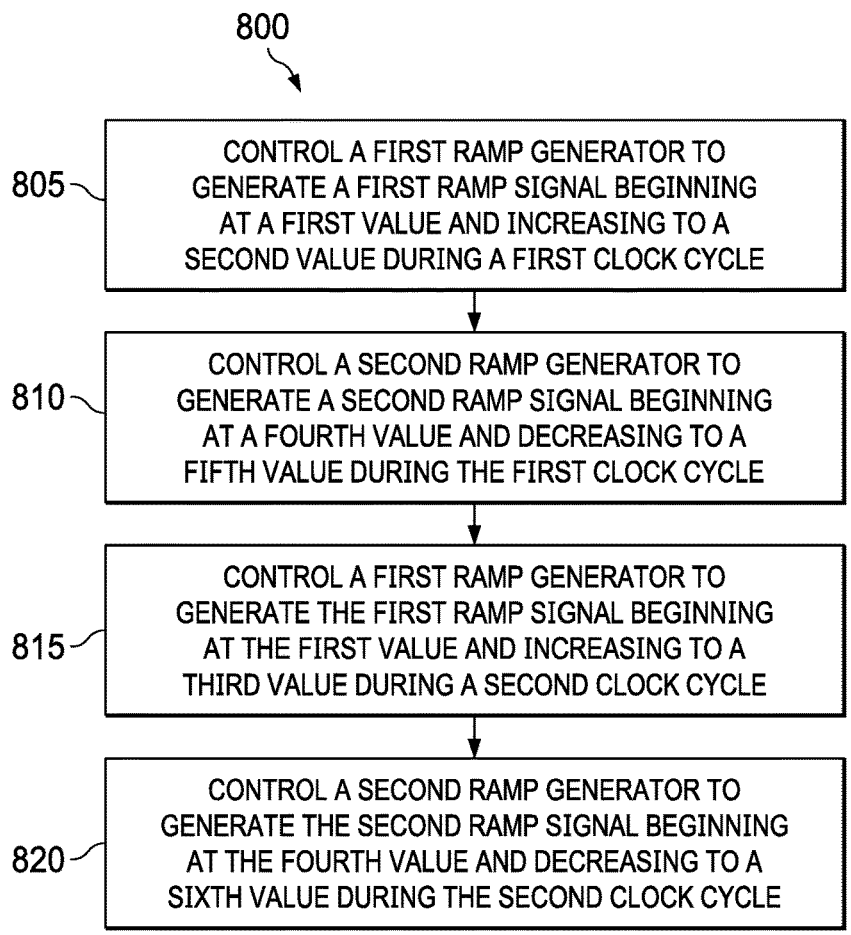
FIG. 8 shows a flowchart of an illustrative method in accordance with various examples.

At operation 610, the controller controls the power converter to operate in a buck-boost mode of operation (e.g., in which a buck cycle is followed by a boost cycle followed by a buck cycle and repeating). While operating in the buck-boost mode of operation, in at least some examples, the controller manipulates the boost ramp such that a minimum value of the boost ramp alternates between being greater than and being less than about Vin/K and manipulates the buck ramp such that a maximum value of the buck ramp alternates between being less than and being greater than about Vin/K. Turning for a moment to FIG. 8, a flowchart of an illustrative method 800 of control of a power converter while operating in the buck-boost mode of operation is shown. In at least some examples, the method 800 is a sub-method, describing operations of the controller during operation 610 of the method 600. At operation 805, the controller controls a first ramp generator, such as a buck ramp generator, to generate a first ramp signal beginning at a first value and increasing to a second value during a first clock cycle. At operation 810, the controller controls a second ramp generator, such as a boost ramp generator, to generate a second ramp signal beginning at a fourth value and decreasing to a fifth value during the first clock cycle. At operation 815, the controller controls the first ramp generator to generate the first ramp signal beginning at the first value and increasing to a third value during a second clock cycle. At operation 820, the controller controls the second ramp generator to generate the second ramp signal beginning at the fourth value and decreasing to a sixth value during the second clock cycle. In at least some examples, the second clock cycle immediately follows the first clock cycle (e.g., the first clock cycle and the second clock cycle are consecutive in a clock signal). In at least some examples, while the controller determines that the power converter is in the buck-boost mode of operation, after the second clock cycle (after operation 820) the controller begins again at operation 805 and repeats the method 800.

In at least some examples, the controller controls the boost ramp generator to modify the boost ramp such that a minimum value of the boost ramp decreases from about Vin/K+Vout/K to about X1*Vin/K during operation 810 and from about Vin/K+Vout/K to about X2*Vin/K during operation 820, where X2 is less than 1. Additionally, in at least some examples, the controller controls the buck ramp generator to modify the buck ramp such that a maximum value of the boost ramp increases from about 0 to about X3*Vin/K during the first clock cycle and from about 0 to about X4*Vin/K during the second clock cycle, where X3 is greater than 1 and X4 is less than 1. In various examples, X1, X2, X3, and X4 may each be any suitable values within the parameters provided herein, however, in at least one example X1 is 1.2, X2 is 0.9, X3 is 1.1, and X4 is 0.8. In various examples, the precise values of X1, X2, X3, and/or X4 may be varied, within the parameters set forth herein, and selected according to capabilities of a power converter that is utilized. For example, use of a gate driver capable of operation at high-speeds may enable X1, X2, X3, and/or X4 to be closer to 1, decreasing a size of the buck-boost region of operation existing between the minimum values of the boost ramp and the maximum values of the buck ramp.

Returning now to FIG. 6, while operating in the buck mode of operation the controller additionally controls a value of a BUH_BOL signal to alternate in value, with a value of BUH_BOL during a current clock cycle representing an operation of the power converter in an immediately preceding clock cycle (BUH_BOL has a high value for a clock cycle immediately following a buck cycle of the power converter and has a low value for a clock cycle immediately following a boost cycle of the power converter), a value of a BUBO signal to have a high value, and a value of a GAP_DETECT signal to have a low value unless the controller determines that the internal control signal crosses neither the buck ramp nor the boost ramp while CLK has a low value. In at least one example, the controller controls the power converter to continue operating in the buck-boost mode of operation until an exit condition occurs. The exit conditions include, for example, occurrence of boost cycles in two consecutive clock cycles (e.g., with no interceding buck cycles or rising edges of GAP_DETECT) or buck cycles in two consecutive clock cycles (e.g., with no interceding boost cycles or rising edges of GAP_DETECT). When an exit condition occurs, the method 600 returns to operation 605 when the exit condition was two consecutive buck cycles and exits to operation 615 when the exit condition was two consecutive boost cycles.

At operation 615, the controller controls the power converter to operate in a boost mode of operation (e.g., in which a boost cycle is followed by another boost cycle). While operating in the boost mode of operation, in at least some examples, the controller manipulates a buck ramp of the controller such that a maximum value of the buck ramp is decreased. In at least some examples, the method 700 of FIG. 7 is also illustrative of control of a power converter while operating in the boost mode of operation. In at least some examples, the method 700 is a sub-method, describing operations of the controller during operation 615 of the method 600 in which the first value is about 0, the second values is less than about Vin/K, the third value is about Vin/K+Vout/K, and the fourth value is less than about Vin/K. For example, the controller controls the buck ramp generator such that the buck ramp such that a maximum value of the buck ramp is less than Vin/K and the buck ramp increases each clock cycle from about 0 to about X4*Vin/K. Additionally, the controller controls the boost ramp generator such that the boost ramp decreases each clock cycle from about Vin/K+Vout/K to about Vin/K. Additionally, while operating in the boost mode of operation, the controller controls a value of a BUH_BOL signal to have a low value, a value of a BUBO signal to have a low value, and a value of a GAP_DETECT signal to have a low value unless the controller determines that the internal control signal crosses neither the buck ramp nor the boost ramp while CLK has a low value. In at least one example, the controller controls the power converter to continue operating in the boost mode of operation until an exit condition occurs. The exit conditions include, for example, occurrence of a gap detection (e.g., as indicated by a rising edge in a GAP_DETECT signal) or detection of a buck cycle occurring while operating in the boost mode of operation. For example, if a large value and/or sudden or sharp change occurs in Vin or a load receiving Vout while operating in the boost mode of operation, a loop controller may directly control the power converter to perform a buck cycle despite the controller indicating operating in the boost mode of operation for one additional clock cycle. When an exit condition occurs, the method 600 returns from operation 605 to operation 610.

Additionally, in the foregoing discussion, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device, element, or component couples to a second device, element, or component, that coupling may be through a direct coupling or through an indirect coupling via other devices, elements, or components and connections. Similarly, a device, element, or component that is coupled between a first component or location and a second component or location may be through a direct connection or through an indirect connection via other devices, elements, or components and/or couplings. A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device that is said to include certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be configured to couple to at least some of the passive elements and/or the sources to form the described structure either at a time of manufacture or after a time of manufacture, for example, by an end-user and/or a third-party.

While certain components are described herein as being of a particular process technology (e.g., field effect transistor (FET), metal oxide semiconductor FET (MOSFET), n-type, p-type, etc.), these components may be exchanged for components of other process technologies (e.g., replace FET and/or MOSFET with bi-polar junction transistor (BJT), replace n-type with p-type or vice versa, etc.) and reconfiguring circuits including the replaced components to provide desired functionality at least partially similar to functionality available prior to the component replacement. Components illustrated as resistors, unless otherwise stated, are generally representative of any one or more elements coupled in series and/or parallel to provide an amount of impedance represented by the illustrated resistor. Additionally, uses of the phrase "ground voltage potential" in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about", "approximately", or "substantially" preceding a value means +/−10 percent of the stated value.

The above discussion is meant to be illustrative of the principles and various examples of the present disclosure. Numerous variations and modifications will become apparent to those skilled in the art once the above disclosure is fully appreciated. It is intended that the present disclosure be interpreted to embrace all such variations and modifications.

What is claimed is:

1. A circuit, comprising:
   a first ramp generator;
   a second ramp generator operating concurrently with the first ramp generator; and
   a processing element configured to be coupled to the first ramp generator and the second ramp generator, and configured to:
      control the first ramp generator while a power converter is operating in a buck-boost mode of operation to provide a first ramp signal beginning at a first value and increasing to a second value during a first clock cycle, and provide the first ramp signal beginning at the first value and increasing to a third value during a second clock cycle immediately following the first clock cycle; and
      control the second ramp generator while the power converter is operating in the buck-boost mode of operation to provide a second ramp signal beginning at a fourth value and decreasing to a fifth value during the first clock cycle, and provide the second ramp signal beginning at the fourth value and decreasing to a sixth value during the second clock cycle;
      wherein, the first value is 0, the second value is greater than an input voltage Vin divided by a scaling constant K, the third value is less than Vin/K, the fourth value is Vin/K+ an output voltage Vout divided by K, the fifth value is greater than Vin/K, and the sixth value is less than Vin/K.

2. The circuit of claim 1, wherein the processing element is further configured to:
   control the first ramp generator to provide the first ramp signal beginning at the first value and increasing to a seventh value while the power converter is operating in a buck mode of operation; and
   control the second ramp generator to provide the second ramp signal beginning at the fourth value and decreasing to the fifth value while the power converter is operating in the buck mode of operation.

3. The circuit of claim 2, wherein the processing element is further configured to:
   control a BUH_BOL signal to have a high value after a buck cycle of the power converter and have a low value after a boost cycle of the power converter;
   control a BUBO signal to have a low value during the buck mode of operation and during a boost mode of operation of the power converter; and
   control a GAP_DETECT signal to have a high value when an internal control signal does not cross the first ramp signal or the second ramp signal during a low phase of the first clock cycle or the second clock cycle and have a low value when the internal control signal crosses the first ramp signal or the second ramp signal during the low phase of the first clock cycle or the second clock cycle.

4. The circuit of claim 1, wherein the processing element is further configured to:

control the first ramp generator to provide the first ramp signal beginning at the first value and increasing to the third value while the power converter is operating in a boost mode of operation; and control the second ramp generator to provide the second ramp signal beginning at the third value and decreasing to a seventh value while the power converter is operating in the boost mode of operation.

5. The circuit of claim 1, wherein the processing element is further configured to be coupled to the power converter and control switches of the power converter according to the first ramp signal and the second ramp signal to switch an input voltage Vin to a load via at least some of the switches of the power converter.

6. A method, comprising:
controlling a power converter to operate in a buck mode of operation, comprising:
controlling a buck ramp generator to provide a buck ramp signal having a value beginning at 0 and increasing to an input voltage Vin divided by a scaling constant K, wherein the buck ramp signal resets to 0 once per clock cycle; and
controlling a boost ramp generator to provide a boost ramp signal having a value beginning at Vin/K+an output voltage Vout divided by K and decreasing to X1* a first voltage proportional to Vin/K, wherein the boost ramp signal resets to Vin/K+Vout/K once per clock cycle;
controlling the power converter to operate in a buck-boost mode of operation, comprising:
controlling the buck ramp generator to alternatingly provide the buck ramp signal having a value beginning at 0 and increasing to X3* a third voltage proportional to Vin/K and having a value beginning at 0 and increasing to a fourth voltage proportional to Vin/K; and
controlling the boost ramp generator to alternatingly provide the boost ramp signal having a value beginning at Vin/K+Vout/K and decreasing to the first voltage proportional to Vin/K+Vout/K and having a value beginning at Vin/K+Vout/K and decreasing to a second voltage proportional to Vin/K+Vout/K; and
controlling the power converter to operate in a boost mode of operation, comprising:
controlling the buck ramp generator to provide the buck ramp signal having a value beginning at 0 and increasing to the fourth voltage proportional to Vin/K; and
controlling the boost ramp generator to provide the boost ramp signal having a value beginning at Vin/K+Vout/K and decreasing to Vin/K.

7. The method of claim 6, wherein K is any integer value, the first voltage proportional to Vin/K is greater than Vin/K, the second voltage proportional to Vin/K is less than Vin/K, the third voltage proportional to Vin/K is greater than Vin/K, and the second voltage proportional to Vin/K is less than Vin/K.

8. The method of claim 7, wherein K is 2.

9. The method of claim 6, wherein the buck mode of operation includes a plurality of buck cycles of the power converter, wherein the boost mode of operation includes a plurality of boost cycles of the power converter, and wherein the buck-boost mode of operation includes a series of alternating buck cycles of the power converter and boost cycles of the power converter.

10. The method of claim 9, further comprising:
control a BUH_BOL signal to have a high value for a clock cycle following a buck cycle of the power converter in the buck mode of operation and have a low value for a clock cycle following a boost cycle of the power converter in the boost mode of operation;
control a BUBO signal to have a low value during the buck mode of operation and the boost mode of operation and have a high value during the buck-boost mode of operation; and
control a GAP_DETECT signal to have a high value when an internal control signal does not cross the buck ramp signal or the boost ramp signal first and have a low value when the internal control signal crosses the buck ramp signal or the boost ramp signal.

11. The method of claim 10, further comprising:
controlling the power converter to operate in the buck-boost mode of operation after operating in the buck mode of operation when a rising edge of GAP_DETECT is detected during operation in the buck mode of operation or a boost cycle of the power converter occurs while operating in the buck mode of operation; and
controlling the power converter to operate in the buck-boost mode of operation after operating in the boost mode of operation when the rising edge of GAP_DETECT is detected during operation in the boost mode of operation or a buck cycle of the power converter occurs while operating in the boost mode of operation.

12. The method of claim 10, further comprising:
controlling the power converter to operate in the buck mode of operation after operating in the buck-boost mode of operation when two consecutive buck cycles of the power converter are detected; and
controlling the power converter to operate in the boost mode of operation after operating in the buck-boost mode of operation when two consecutive boost cycles of the power converter are detected.

13. The method of claim 6, further comprising controlling switches of the power converter according to the first ramp signal and the second ramp signal to switch Vin to a load via at least some of the switches of the power converter.

14. A system, comprising:
a power converter including transistors; and
a controller coupled to the power converter and comprising:
a first ramp generator;
a second ramp generator operating at the same time as the first ramp generator; and
a processing element configured to couple to the first ramp generator and the second ramp generator, and configured to:
control the first ramp generator while the power converter is operating in a buck-boost mode of operation to provide a first ramp signal beginning at a first value and increasing to a second value during a first clock cycle and provide the first ramp signal beginning at the first value and increasing to a third value during a second clock cycle immediately following the first clock cycle;
control the second ramp generator while the power converter is operating in the buck-boost mode of operation to provide a second ramp signal beginning at a fourth value and decreasing to a fifth value during the first clock cycle and provide the second ramp signal beginning at the fourth value and decreasing to a sixth value during the second clock cycle;

control the first ramp generator to provide the first ramp signal beginning at the first value and increasing to a seventh value while the power converter is operating in a buck mode of operation;
control the second ramp generator to provide the second ramp signal beginning at the fourth value and decreasing to the fifth value while the power converter is operating in the buck mode of operation;
control a BUH_BOL signal to have a high value after a buck cycle of the power converter and have a low value after a boost cycle of the power converter;
control a BUBO signal to have a low value during the buck mode of operation and during a boost mode of operation of the power converter; and
control a GAP_DETECT signal to have a high value when an internal control signal does not cross the first ramp signal or the second ramp signal during a low phase of the first clock cycle or the second clock cycle and have a low value when the internal control signal crosses the first ramp signal or the second ramp signal during the low phase of the first clock cycle or the second clock cycle.

15. The system of claim 14, wherein the processing element is further configured to:
control the first ramp generator to provide the first ramp signal beginning at the first value and increasing to the third value while the power converter is operating in a boost mode of operation; and
control the second ramp generator to provide the second ramp signal beginning at the third value and decreasing to a seventh value while the power converter is operating in the boost mode of operation.

16. The system of claim 15, wherein the seventh value is an input voltage Vin divided by a scaling constant K.

17. The system of claim 14, wherein the first value is 0, wherein the second value is greater than an input voltage Vin divided by a scaling constant K, wherein the third value is less than Vin/K, wherein the fourth value is Vin/K+an output voltage Vout divided by K, wherein the fifth value is greater than Vin/K, and wherein the sixth value is less than Vin/K.

18. The system of claim 14, wherein the processing element is further configured to be coupled to the power converter and control switches of the power converter according to the first ramp signal and the second ramp signal to switch an input voltage Vin to a load via at least some of the switches of the power converter.

19. A circuit, comprising: a first ramp generator;
a second ramp generator operating concurrently with the first ramp generator; and
a processing element configured to be coupled to the first ramp generator and the second ramp generator, and configured to:
control the first ramp generator to provide a first ramp signal beginning at a first value and increasing to a second value while a power converter is operating in a first mode of operation, the first ramp signal resetting to the first value once per clock cycle; and
control the second ramp generator to provide a second ramp signal beginning at a third value and decreasing to a fourth value while the power converter is operating in the first mode of operation, the second ramp signal resetting to the third value once per clock cycle;
wherein when the first mode of operation is a buck mode of operation, the first ramp is a buck ramp, the second ramp is a boost ramp, the first value is 0, the second value is an input voltage Vin divided by a scaling constant K, the third value is Vin/K+an output voltage Vout divided by K, and the fourth value is greater than Vin/K.

20. The circuit of claim 19, wherein when the first mode of operation is a boost mode of operation, the second value is less than an input voltage Vin divided by a scaling constant K, and the fourth value is Vin/K.

21. The circuit of claim 19, wherein the processing element is further configured to:
control the first ramp generator while the power converter is operating in a buck-boost mode of operation to generate the first ramp signal beginning at the first value and increasing to a fifth value during a first clock cycle and generate the first ramp signal beginning at the first value and increasing to a sixth value during a second clock cycle immediately following the first clock cycle; and
control the second ramp generator while the power converter is operating in the buck-boost mode of operation to generate the second ramp signal beginning at the third value and decreasing to the fourth value during the first clock cycle and generate the second ramp signal beginning at the third value and decreasing to a seventh value during the second clock cycle.

22. The circuit of claim 21, wherein the first ramp is a buck ramp, wherein the second ramp is a boost ramp, wherein the fifth value is greater than an input voltage Vin divided by a scaling constant K, wherein the sixth value is less than Vin/K, and wherein the seventh value is less than Vin/K.

23. A circuit, comprising:
a processing element configured to:
implement a state machine for use in controlling a buck-boost power converter;
monitor an internal control signal to determine whether the internal control signal crosses a buck ramp signal or a boost ramp signal during a clock cycle; and
transition to a buck-boost state of the state machine when the internal control signal does not cross the buck ramp signal or the boost ramp signal during the clock cycle;
wherein, while in the buck-boost state of the state machine, the processing element is configured to:
control a first ramp generator to provide the buck ramp signal beginning at zero and increasing to a value greater than an input voltage Vin divided by a scaling constant K during a second clock cycle and provide the first ramp signal beginning at zero and increasing to a value less than Vin/K during a third clock cycle immediately following the second clock cycle; and
control a second ramp generator to provide the boost ramp signal beginning at a value approximately equal to Vin/K+an output voltage Vout divided by K, and decreasing to a value greater than Vin/K during the second clock cycle and provide the second ramp signal beginning at a value approximately equal to Vin/K+an output voltage Vout divided by K and decreasing to a value less than Vin/K during the third clock cycle.

24. The circuit of claim 23, wherein the processing element is further configured to couple to the buck-boost power converter and control switches of the buck-boost power converter according to the buck ramp signal and the boost ramp signal to switch an input voltage Vin to a load via at least some of the switches of the buck-boost power converter.

* * * * *